(12) United States Patent
Braeuchle et al.

(10) Patent No.: US 11,400,949 B2
(45) Date of Patent: Aug. 2, 2022

(54) METHOD FOR PRODUCING A CONTROL SYSTEM FOR A MOTOR VEHICLE, AND CONTROL SYSTEM

(71) Applicant: Robert Bosch GmbH, Stuttgart (DE)

(72) Inventors: Goetz Braeuchle, Reichartshausen (DE); Thorsten Maucher, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 16/765,692

(22) PCT Filed: Nov. 8, 2018

(86) PCT No.: PCT/EP2018/080634
§ 371 (c)(1),
(2) Date: May 20, 2020

(87) PCT Pub. No.: WO2019/137653
PCT Pub. Date: Jul. 18, 2019

(65) Prior Publication Data
US 2020/0298869 A1    Sep. 24, 2020

(30) Foreign Application Priority Data
Jan. 11, 2018  (DE) ......................... 102018200313.0

(51) Int. Cl.
*B60W 50/00* (2006.01)
*B60R 16/023* (2006.01)
*G05B 19/042* (2006.01)

(52) U.S. Cl.
CPC ..... *B60W 50/0098* (2013.01); *B60R 16/0231* (2013.01); *G05B 19/042* (2013.01);
(Continued)

(58) Field of Classification Search
CPC ............ B60W 50/0098; B60W 50/023; G05B 19/0426; G05B 2219/14015;
(Continued)

(56) References Cited

U.S. PATENT DOCUMENTS 6,104,971 A * 8/2000 Fackler .............. G05B 19/0426
701/34.3
6,208,923 B1  3/2001 Hommel
(Continued)

FOREIGN PATENT DOCUMENTS

| CN | 103974854 A * | 8/2014 | ......... B60R 16/0234 |
| DE | 19736231 A1 | 2/1999 | |

(Continued)

OTHER PUBLICATIONS

International Search Report for PCT/EP2018/080634, dated Feb. 19, 2019.

*Primary Examiner* — Behrang Badii
(74) *Attorney, Agent, or Firm* — Norton Rose Fulbright US LLP; Gerard Messina

(57) ABSTRACT

A method for producing a control system, in particular a driver assistance system, of a motor vehicle. The method includes the following steps: providing a first control unit, setting vehicle-specific operating parameters for the motor vehicle in the first control unit for its encoding, providing a second control unit and connecting in terms of signaling the second control unit to the first control unit, transmitting the encoding of the first control unit to the second control unit.

10 Claims, 1 Drawing Sheet

(52) U.S. Cl.
CPC .............. *G05B 2219/14002* (2013.01); *G05B 2219/14014* (2013.01)

(58) Field of Classification Search
CPC ........... G05B 2219/14014; G05B 2219/14002; G05B 19/042; B60T 8/885; B60T 2270/413; B60T 2270/406; B60R 16/0232; B60R 16/0315; B60R 16/0231
See application file for complete search history.

(56) References Cited

U.S. PATENT DOCUMENTS

| | | | |
|---|---|---|---|
| 2016/0097312 A1* | 4/2016 | Nilsson | F01N 3/22 60/274 |
| 2016/0209507 A1* | 7/2016 | Backström | G01S 13/867 |
| 2016/0259584 A1* | 9/2016 | Schlottmann | H04L 9/3234 |

FOREIGN PATENT DOCUMENTS

| | | |
|---|---|---|
| DE | 10245196 A1 | 4/2004 |
| DE | 102009046234 A1 | 5/2011 |
| DE | 102014015445 A1 | 4/2015 |
| JP | 2003204344 A | 7/2003 |
| JP | 2005018105 A | 1/2005 |
| JP | 2010113409 A | 5/2010 |
| JP | 2011025781 A | 2/2011 |
| WO | 2015173134 A1 | 11/2015 |
| WO | 2017178211 A1 | 10/2017 |

\* cited by examiner

METHOD FOR PRODUCING A CONTROL SYSTEM FOR A MOTOR VEHICLE, AND CONTROL SYSTEM

FIELD

The present invention relates to a method for producing a control system, in particular a driver assistance system, of a motor vehicle. In addition, the present invention relates to a control system for a motor vehicle which is produced in particular according to the above-mentioned method.

BACKGROUND INFORMATION

With the increasing number of electrical/electronic control systems in motor vehicles, the number of control units and other electrical components is likewise increasing. The demand for safety, in particular for the failsafe operation of these types of systems is also increasing, in particular within the context of the electrification of the drive systems and providing functions to facilitate full or semi-autonomous driving operation. Redundant approaches in particular are required, which ensure that continued, safe operation of the motor vehicle is possible even if a control unit fails. While previously essentially independent control units were installed which provided a complete assistance function by themselves, however, the number of approaches in which an assistance function is provided by multiple control units working together has increased. This complicates the design of the individual control unit, in particular for vehicle-specific adaptation; however, it offers the advantage of a more easily achieved redundancy.

Two control units, which have the same encoding, are necessary for completely redundant operation. Encoding is understood in the context of the present invention to be the parameterization of the control unit with vehicle-specific operating parameters. These vehicle-specific operating parameters must be present in both control units; both control units are thus provided with the same encoding, in order to facilitate redundant operation. If, however, each control unit is encoded individually during production, then this means there is also a high cost for testing the control units before their installation in the motor vehicle.

SUMMARY

An example method according to the present invention may have the advantage that the encoding of the second control unit is carried out easily, and in particular without further action by a technician, so that the producing steps are simplified and a vehicle-specific adaptation of a second control unit is first carried out in the vehicle itself. As a result, the producing complexity is substantially simplified and producing costs are reduced. This is achieved in the following way according to the present invention: initially, a first control unit is provided, which is encoded by setting vehicle-specific operating parameters for the target motor vehicle. For the encoding, adapted, vehicle-specific operating parameters, which enable operation of the control unit in the motor vehicle using the desired function, are set or stored in the first control unit for the target vehicle, i.e., the motor vehicle which will use the control system. A second control unit is subsequently provided and connected in terms of signaling to the first control unit, so that a data transmission may occur between the two control units. The encoding of the first control unit is subsequently transmitted to the second control unit due to this connection in terms of signaling. All vehicle-specific parameters known to the first control unit are thus also transmitted to the second control unit and stored there for its encoding. A simple encoding of the second control unit results in this way, which is then available in the control system or driver assistance system as a redundant control unit. This offers the manufacturer the option of providing standard control units, for example, uncoded or blank control units, which are first encoded during use in the respective control system by the first control unit already located there, and are thus adapted to the motor vehicle and to the functions to be met. An encoding error is additionally easily recognized by a simple comparison of the encoding of the two control units with one another. In particular, checksums are produced and compared with one another, which facilitates a particularly simple error detection.

The transmission of the encoding takes place in particular by the first control unit. The first control unit is designed, in particular, to detect the connection in terms of signaling to the second control unit and to transmit its encoding to the second control unit upon detecting the connection. Alternatively, the second control unit is designed, following a successful detection of the connection in terms of signaling, to query the first control unit for the encoding, which is then transmitted as a response.

In addition, the transmission of the encoding is particularly preferably carried out as a background process or secondary process, so that the primary functions of at least the first control unit may also be maintained and carried out during the transmission of the encoding. A transmission of the encoding is then also already facilitated during ongoing operation of the first control unit.

In addition, the encoding is particularly preferably carried out by storing the vehicle-specific operating parameters in a non-volatile memory of the respective control unit, as previously indicated.

According to one preferred refinement of the present invention, a BUS connection is used as the connection in terms of signaling. These types of connections have meanwhile become standard in motor vehicles, so that already present joining technology may be used. A simple integration thus results, in particular of the second control unit into the control system.

According to one preferred refinement of the present invention, it is also provided that the transmission of the encoding takes place by a multiplex method. Thus, the bandwidth, which is used to transmit the encoding, is reduced in order to keep the BUS load negligible. In particular, a background operation or a background process for transmitting the encoding to the second control unit is ensured in this way using simple means.

The transmission of the encoding preferably takes place encrypted and/or signed. This ensures that the encoding is not transmitted, for example, to an unjustified or unauthorized control unit.

An example control system according to the present invention includes that the second control unit is designed to assume the encoding from the first control unit, and the control system is designed, in particular, to carry out the example method according to the present invention in order to encode the second control unit. The previously mentioned advantages result from this.

The present invention in greater detail based below on the figures.

DETAILED DESCRIPTION OF EXAMPLE EMBODIMENTS

DETAILED DESCRIPTION OF EXAMPLE EMBODIMENTS

Figure 1:
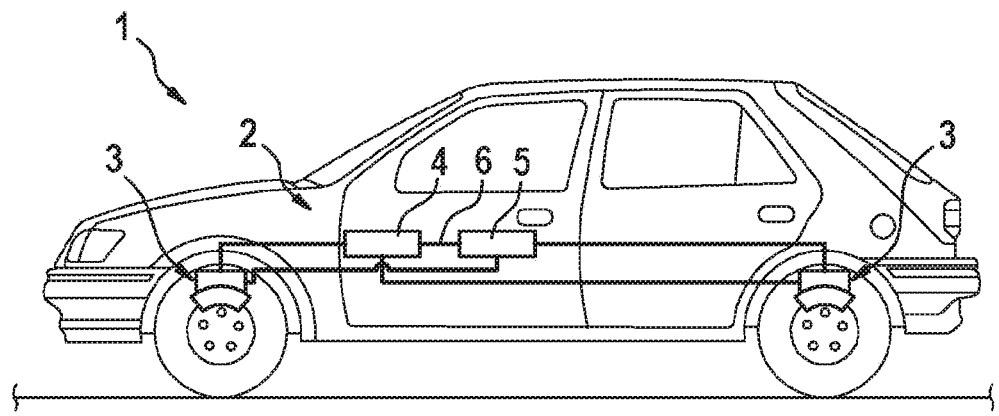
FIG. 1 shows an advantageous control system in a simplified depiction in accordance with the present invention.

FIG. 1 shows a motor vehicle 1 in a simplified depiction including an electrical/electronic control system 2, which is a driver assistance system of motor vehicle 1. The present control system 2 is a braking system, which includes multiple wheel brakes 3, which are each assigned to a wheel of the motor vehicle. The wheel brakes are activatable or actuatable by a first control unit 4. In particular, one or more electrically activatable/actuatable valves of respective wheel brake 3 are connected in terms of signaling to the control unit for this purpose. By actuating the valves, a hydraulic pressure is applied, in particular, to wheel brakes 3, in order to decelerate motor vehicle 1 as needed. In particular, this is an autonomous or semi-autonomous control system 2, which carries out a brake application independent of the input of a driver of motor vehicle 1, for example, in a semi- or fully autonomous driving operation or parking operation or the like.

Because different motor vehicle types require the wheel brakes to be actuated differently in autonomous or semi-autonomous driving operation, for example, based on different weight classes, the number of wheel brakes, and/or achievable braking values, the control unit is encoded before the startup of the motor vehicle, in that it is supplied with vehicle-specific operating parameters, due to which a vehicle specific operation of control system 2 or of the assistance system is facilitated. For this purpose, the vehicle-specific operating parameters are stored in a non-volatile memory of control unit 4, for example during the producing of control unit 4, which is then preferably installed in motor vehicle 1 at a later point in time.

Based on the increased demands for operational safety of this type of control system, motor vehicle 1 additionally includes a second control unit 5, which is present in control system 2 redundant to control unit 4, and therefore is likewise connected in terms of signaling to wheel brakes 3.

Figure 2:
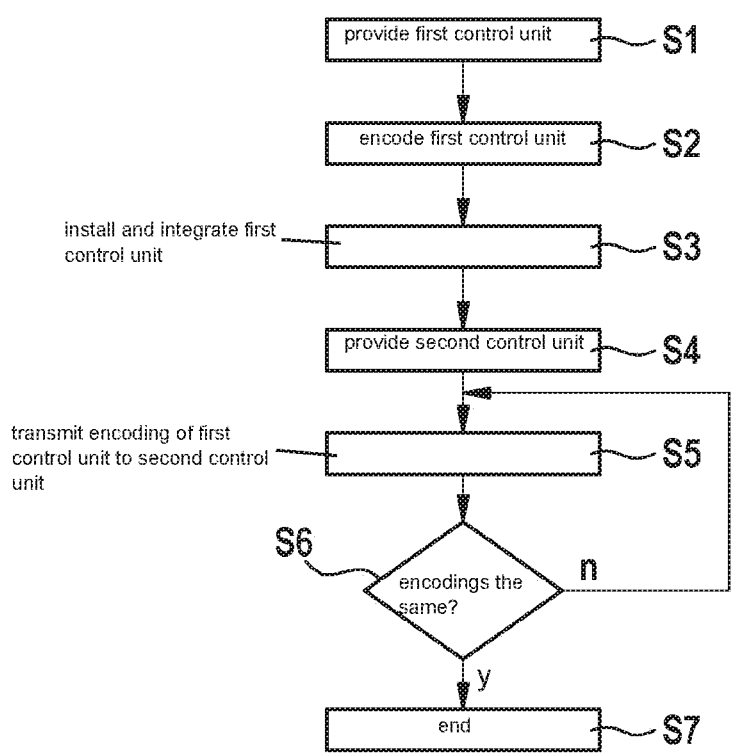
FIG. 2 shows a flow chart for explaining one example method for operating or producing the control system in accordance with the present invention.

The producing of control system 2 is subsequently explained in greater detail by way of the flow chart shown in FIG. 2.

In a first step S1, first control unit 4 is provided and encoded as previously described in a subsequent step S2. Vehicle-specific operating parameters are written for this purpose into a non-volatile memory of control unit 4. Control unit 4 uses these parameters in order to optimally activate wheel brakes 3, for example, to carry out a semi- or fully autonomous brake application, for example, within the scope of a parking maneuver or the like.

In step S3, control unit 4 is subsequently installed in motor vehicle 1 and integrated into control system 2. For this purpose, control unit 4 is electrically connected or connected in terms of signaling in particular to wheel brakes 3 for their activation.

To ensure the redundancy of control system 2, second control unit 5 is provided in a step S4 and connected to first control unit 4. A BUS connection 6, for example, of motor vehicle 1 is used for this purpose. In addition, control unit 4 is likewise connected to wheel brakes 3, in order to facilitate the redundant operation of control system 2. Control unit 5 is a blank or uncoded control unit 5, no vehicle-specific operating parameters being stored in its memory.

After control unit 5 has been integrated into control system 2, the encoding of control unit 4 is transmitted to control unit 5 due to connection 6 in a step S5, so that all operating parameters stored in control unit 4 are also transmitted to control unit 5. Control unit 5 is thus encoded with the aid of control unit 4. A separate or upstream encoding step is omitted. Thus, a specific encoding protocol does not need to be implemented or tested in control unit 5. In particular, the transmission of the encoding is carried out in the background and by control unit 4, which represents the primary system. The producing time for control system 2 is thereby reduced overall. The transmission of the encoding is preferably carried out from control unit 4 to control unit 5 using an established standard (protocol) with the aid of encryption and/or signing, so that an unauthorized transfer or removal of the encoding is prevented. To keep the bandwidth low during the encoding of control unit 5, the transmission of the encoding or of the vehicle-specific operating parameters is preferably carried out using a multiplex method. The encoding is thus transmitted from control unit 4 to control unit 5 in particular in a background operation or process.

Using the advantageous method achieves that a separate encoding of redundant control unit 5 is prevented in advance. The option is thus provided to produce or provide standard control units or uncoded control units, which are then only encoded upon installation or integration into control system 2, in particular, automatically by the already present and encoded control unit. This yields the advantage that one of the control units may be easily replaced for maintenance or repair purposes. The newly installed, standard control unit is then encoded by the control unit remaining in control system 2. First control unit 4 as well as second control unit 5 may thus be replaced, the respectively remaining control unit then becoming the primary control unit, which carries out the encoding process of the new control unit.

To ensure that the encoding is successfully carried out, the encoding of control unit 5 is compared with the original encoding of control unit 4 in a further step S6. For example, checksums are produced, which are compared with one another for this purpose. If the checksums and/or the operating parameters deviate from one another (n), then the encoding process is repeated in step S5 until the encodings match. If the encodings or the checksums match (y), then the method is ended in a step S7 and control system 2 is completed.

What is claimed is:

1. A method for producing a control system of a motor vehicle, the method comprising:
    providing a first control unit;
    encoding the first control unit by setting vehicle-specific operating parameters for the motor vehicle in the first control unit as its coding;
    providing a second control unit and connecting the second control unit to the first control unit in terms of signaling to the first control unit; and
    transmitting the coding of the first control unit to the second control unit;
    wherein the first control unit, which is coupled for providing signals to wheel brakes, includes an autonomous or semi-autonomous control system, which carries out a brake application independent of an input of a driver of the motor, in a semi-autonomous or fully autonomous driving operation or parking operation,
    wherein the first control unit is encoded before a startup of the motor vehicle, in which it is supplied with the vehicle-specific operating parameters, by which a vehicle specific operation of the control system is provided, wherein the vehicle-specific operating parameters are pre-stored in a non-volatile memory of the first control unit, wherein the second control unit, which is redundant to the control unit, is coupled so as to provide signaling to the wheel brakes, and wherein the vehicle-specific operating parameters are not pre-stored in a non-volatile memory of the second control unit, since the coding is received from the first control unit, in which the second control unit is encoded with the first control unit, so that a separate or upstream encoding step pf the second control unit is omitted and so that a specific encoding protocol is not implemented or tested in the second control unit.

2. The method as recited in claim 1, wherein the control system is a driver assistance system of the motor vehicle.

3. The method as recited in claim 1, wherein the transmission of the coding is carried out by the first control unit.

4. The method as recited in claim 1, wherein the transmission of the coding is carried out as a background process.

5. The method as recited in claim 1, wherein the encoding takes place by storing the vehicle-specific operating parameters in a non-volatile memory of the first control unit.

6. The method as recited in claim 1, wherein a BUS connection is used as the connection of the second control unit to the first control unit in terms of signaling.

7. The method as recited in claim 1, wherein the transmission of the coding takes place using a multiplex method.

8. The method as recited in claim 1, wherein the transmission of the coding takes place encrypted and/or signed.

9. A control system for a motor vehicle, comprising:
a first control unit which is encoded by vehicle-specific operating parameters as its coding; and
at least one second control unit to assume the coding from the first control unit;

wherein the control system is configured to encode the second control unit by connecting the second control unit to the first control unit in terms of signaling to the first control unit, and transmitting the coding of the first control unit to the second control unit;

wherein the first control unit, which is coupled for providing signals to wheel brakes, includes an autonomous or semi-autonomous control system, which carries out a brake application independent of an input of a driver of the motor, in a semi-autonomous or fully autonomous driving operation or parking operation, wherein the first control unit is encoded before a startup of the motor vehicle, in which it is supplied with the vehicle-specific operating parameters, by which a vehicle specific operation of the control system is provided, wherein the vehicle-specific operating parameters are pre-stored in a non-volatile memory of the first control unit, wherein the second control unit, which is redundant to the control unit, is coupled so as to provide signaling to the wheel brakes, and wherein the vehicle-specific operating parameters are not pre-stored in a non-volatile memory of the second control unit, since the coding is received from the first control unit, in which the second control unit is encoded with the first control unit, so that a separate or upstream encoding step pf the second control unit is omitted and so that a specific encoding protocol is not implemented or tested in the second control unit.

10. The control system as recited in claim 9, wherein the control system includes a driver assistance system of the motor vehicle.

\* \* \* \* \*